(12) United States Patent
Catrinta

(10) Patent No.: US 6,450,310 B1
(45) Date of Patent: Sep. 17, 2002

(54) CLUTCH BRAKE ASSEMBLY

(76) Inventor: John Catrinta, 5130 N. Kildare, Chicago, IL (US) 60630

( * ) Notice: Subject to any disclaimer, the term of this patent is extended or adjusted under 35 U.S.C. 154(b) by 53 days.

(21) Appl. No.: 09/795,557

(22) Filed: Feb. 28, 2001

Related U.S. Application Data

(60) Provisional application No. 60/243,161, filed on Oct. 25, 2000.

(51) Int. Cl.[7] ............................................. F16D 67/02
(52) U.S. Cl. ................................. 192/13 R; 192/18 R
(58) Field of Search ........................... 192/13 R, 18 R, 192/DIG. 1; 188/218 XL, 73.32

(56) References Cited

U.S. PATENT DOCUMENTS

| | | |
|---|---|---|
| 540,558 A | 6/1895 | Peregrine |
| 553,525 A | 1/1896 | Hankin |
| 555,512 A | 3/1896 | Johnson |
| 714,605 A | 11/1902 | Potter |
| 744,917 A | 11/1903 | Houldsworth |
| 1,453,673 A | 5/1923 | Herbert |
| 2,942,708 A | 6/1960 | Eason |
| 3,584,717 A | 6/1971 | Suppes et al. |
| 3,626,540 A | 12/1971 | Rood |
| 4,043,437 A | 8/1977 | Taylor |
| 4,186,826 A | 2/1980 | MacKendrick et al. |
| 4,512,450 A | 4/1985 | Babcock |
| 5,031,739 A | 7/1991 | Flotow et al. |
| 5,076,406 A | 12/1991 | Gregory et al. |
| 5,099,970 A | 3/1992 | Harris |
| 5,285,881 A | 2/1994 | Lero et al. |
| 5,415,256 A | 5/1995 | Weigand et al. |

*Primary Examiner*—Saul Rodriguez
(74) *Attorney, Agent, or Firm*—Cook, Alex, McFarron, Manzo, Cummings & Mehler, Ltd.

(57) ABSTRACT

A clutch brake for a heavy duty automotive clutch. The clutch brake consists of two semiannular halves each having first and second ends. Each half has one tab disposed inwardly which is adapted to connect with the keyways in the input shaft of the transmission. The two halves are pivotally connected at one end prior to installation. The second ends of the two halves are shaped such that they interlock, forming an annular assembly about the shaft.

20 Claims, 3 Drawing Sheets

CLUTCH BRAKE ASSEMBLY

CROSS REFERENCE TO RELATED APPLICATION

This application claims the benefit of the filing date of provisional application Ser. No. 60/243,161, filed Oct. 25, 2000.

BACKGROUND OF THE INVENTION

1. Technical Field

This invention relates to friction clutches and transmissions for large automotive vehicles.

2. Background Art

The use and function of a clutch brake are well known in the art. The purpose of a clutch brake is to aid in gear shifting in non-synchronized transmissions.

The clutch brake, which has a generally flat and annular shape, is splined onto the transmission input shaft in between the release bearing mechanism and transmission. Upon disengagement of the main clutch of the vehicle, the clutch brake retards and stops the rotation of the driven shaft so that a smooth gear shifting operation may be performed.

Because of its relatively small size and the torsional forces to which it is subjected during use, replacement of the clutch brake is often required prior to the replacement of the main clutch and transmission.

A number of clutch brake designs are in use. All of the known designs, however, have some disadvantages, mostly related to their assembly, installation and removal. Categorizing these known designs according to their installation procedure, clutch brakes are available in three versions: a unitary annular assembly, an assembly with two separate mating halves, and a hinged assembly.

The unitary assembly, although inexpensive, is replaced by partially disassembling the clutch, disassembling the transmission, or by fracturing the clutch brake in two places to allow its removal. All three options are costly, the last one being potentially even dangerous.

Clutch brakes that comprise two mating halves assembled and secured to form an annular assembly are exemplified by the clutch brakes shown in U.S. Pat. No. 4,512,450 to Babcock, U.S. Pat. No. 5,031,739 Flotow et al. and U.S. Pat. No. 5,076,406 to Gregory et al.

U.S. Pat. No. 4,512,450 to Babcock discloses a clutch brake comprising a pair of initially separate semi-annular sections having radial interlocking teeth, which permit the clutch brake to be assembled as it is installed on the driven shaft. The halves are placed along the periphery of the shaft with the tangs located in keyways along the shaft. The halves are then assembled by engaging the interlocking teeth, and then spot welding the components together. Alternatively, pins are assembled into one half of the clutch brake and then are pressed into mating holes in the other half of the clutch brake to secure the components together.

U.S. Pat. No. 5,031,739 to Flotow, et al. discloses a clutch brake formed from a pair of identically shaped semi-annular sections. Each section has circumferentially extending protrusions located at either end, an outer protrusion at one end of the section and an inner protrusion at the other end of the section. Each outer protrusion has a radial clearance hole, and each inner protrusion has a radial threaded hole. In assembly, the sections are placed independently over the shaft. Threaded fasteners are inserted radially into the clearance holes and threaded into the threaded holes to secure the components together. The fasteners form the tangs for securing the brake to the shaft.

U.S. Pat. No. 5,076,406 to Gregory, et al. discloses a clutch brake of two interlocking parts adapted to fit together. In a preferred form, the clutch brake incorporates first and second interlocking U-shaped parts which together define a central aperture to engage a clutch shaft. The second part is radially inserted via a tongue and groove into the first part to couple the two parts together. A bowed spring has a pair of ends which spread apart atop the second interlocking part by application of a radial force sufficient to partially flatten the bowed portion. A pair of aligned bores in the first and second parts receive the ends of the spring, thus securing the two parts together. The bowed portion of the spring includes a non-threaded aperture, and the second part includes a threaded aperture directly under the non-threaded spring aperture. For retaining the bowed portion of the spring in a deflected condition and to retain the two parts together, the shaft of a bolt is inserted through the spring aperture and secured within threaded aperture of the second part. Rotation of the bolt head causes a radially inwardly directed force to deflect the bowed portion. The bolt head also operates to retain the spring in a deflected condition.

A clutch brake having a hinged assembly is shown in U.S. Pat. No. 5,285,881 to Lero et al. This patent discloses a clutch brake comprised of at least two arcuate members pivotally connected to each other by means of a rivet or the like and spaced-apart tabs for coupling the arcuate members to the shaft. To install, one of the arcuate members is positioned about the shaft and the second arcuate member then pivoted inward to form a closed annular assembly about the shaft. A second fastening rivet is then installed in the opposite ends of the arcuate members to couple the components together and secure the assembly to the shaft. The force for installing the second rivet may be provided by a tool or by a force created by depressing the clutch pedal.

While a clutch brake is generally simple in its structure and function, the designs of the prior art typically include small pieces that are difficult to work with in the small spaces encountered during installation and/or are difficult to remove safely and without damage to the clutch brake and the adjacent components of the clutch.

Each of the multi-component clutch brakes designs of the prior art requires extensive on-site assembly, as the separate components are assembled together as they are placed over or assembled on the shaft. This on-site assembly is generally cumbersome, in that the assembler must reach through an inspection portion of the bell housing of the transmission approximately 5 inches by 8 inches in size in order to secure the clutch brake along opposite sides of the shaft. Further loose components, such as pins and threaded fasteners may be easily lost during the "blind" installation. These loose parts can damage the transmission if left loose in the transmission housing.

Additionally, special installation tools are often required to perform the assembly. Such tools may be unavailable on a remote repair site. Further, such dedicated tools may present significant expense. For example, welding equipment is quite expensive, and may not be readily available or portable.

The prior art also offers a number of interlocking clutch brakes of the type referred to as "replaceable." Most however are relatively expensive to manufacture, and require relatively complex apparatus for their manufacture and use. Several of the devices are easily installed, but difficult to remove after installation. The clutch brake described in Babcock et al., for example, requires the use of spot welding for installation of the clutch brake on a clutch shaft, but subsequently requires the use of a torch to cut the used clutch brake from the shaft. A more convenient system would avoid any use of welding, and would preferably require only the use of a single hand-operated tool for both assembly and disassembly.

Accordingly, it is an object of the present invention to provide a clutch brake assembly that is easily installed on and removed from the transmission input shaft without damage to the clutch brake.

It is a further object of the present invention to provide a clutch brake that may be installed or removed without the use of special tools and, more specifically, may be installed or removed manually.

It is an additional object to provide a clutch brake assembly that does not include small parts or pieces that may be difficult to manipulate in the confined areas encountered in its installation of the clutch brakes.

SUMMARY OF THE INVENTION

These objects, as well as others that will become apparent upon reference to following detailed description and accompanying drawings, are achieved by a clutch brake adapted to be connected to a rotary shaft having a pair of radially opposed keyways in which the clutch brake has first and second arcuate members, each with first ends and second ends. A pivot connector couples the first end of each arcuate member to the other arcuate member so that the arcuate members pivot with respect to each other in a substantially flat, coplanar relationship. Each of the first and second arcuate members includes a projecting tab for engagement with one of the keyways of the shaft. The second ends of each arcuate member includes a complementarily-shaped mating projection to releasably join the second ends of the arcuate members to each other to removably secure the clutch brake to the shaft.

When the clutch brake is closed about the shaft, the two arcuate members are forced out of their coplanar relationship upon the initial engagement of the complementarily-shaped mating projections. When the arcuate members return to their coplanar relationship upon the proper seating of the mating projections, an audible noise is created to indicate to the installer that the clutch brake has been securely attached to the shaft.

In the preferred embodiment, the complementarily-shaped mating projections each have a portion that is inclined away from the second ends of their respective arcuate members and a tab, which seats in a relieved area spaced from the second end.

The pivotal connector may be adapted to permit a minor amount of non-coplanar pivotal movement between the two arcuate members to accommodate the engagement of the complementarily-shaped mating projections. In the preferred embodiment, this is accomplished by having a rivet with a head that is received in a countersunk portion on the first end of one of the arcuate members, with a flexible washer, commonly known as a "belleville washer," secured to the shaft of the rivet underneath the head.

The second ends of each arcuate member may include an aperture for receiving a rod. When a rod is received in each of the holes, a pair of levers is provided which may be gripped to facilitate the closing of the clutch brake.

DETAILED DESCRIPTION OF THE PREFERRED EMBODIMENTS

Figure 1:
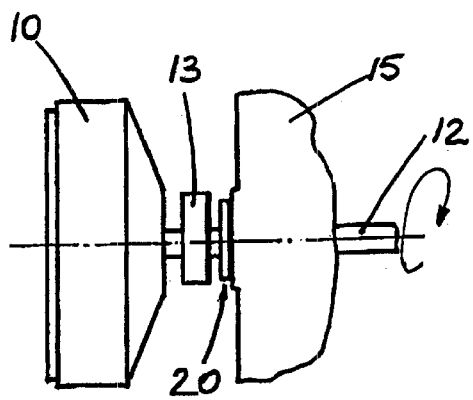
FIG. 1 is a plan view illustrating a clutch and transmission of an automotive vehicle including a clutch brake.
Figure 2:
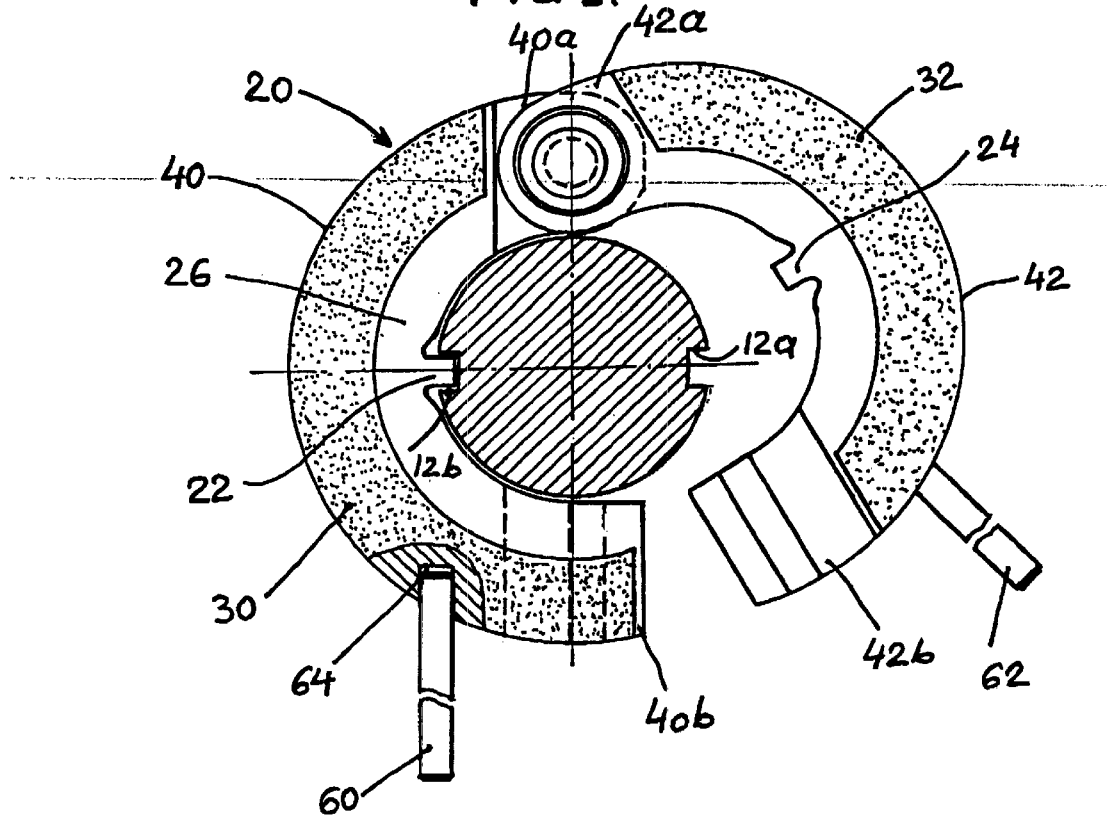
FIG. 2 is a plan view of a clutch brake according to the present invention shown in an open position, with the associated transmission input shaft shown in cross-section.
Figure 4:
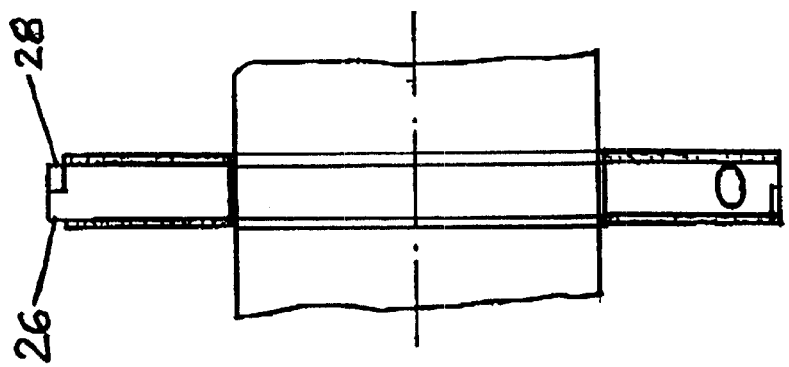
FIG. 4 is a side elevational view of the clutch brake assembly according to the present invention.
Figure 3:
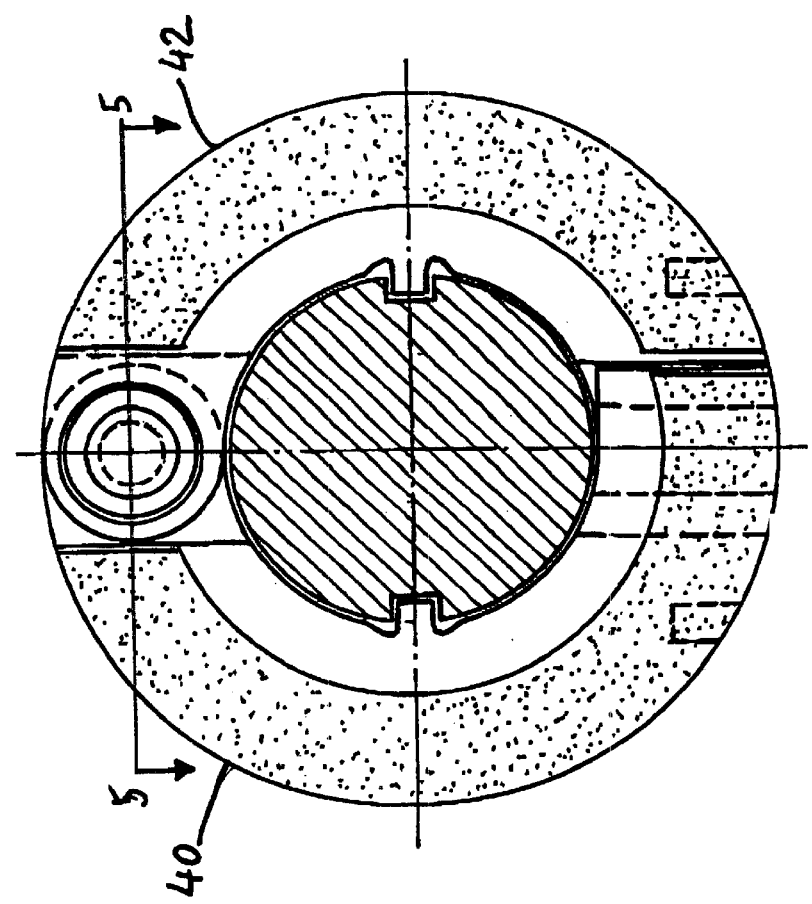
FIG. 3 is a plan view of the clutch brake assembly similar to FIG. 2 but with the clutch brake shown in its closed position.

Referring to the drawings, one embodiment of a clutch brake in accordance with the present invention generally designated 20 is shown.

Referring to FIG. 1, there is schematically illustrated a conventional friction clutch 10 used with a conventional non-synchronized transmission 15. A clutch brake assembly 20 is installed on the input shaft 12 supported by two bearings. One bearing is located within the clutch and the second one mounted in the forward wall of the transmission 15. The input shaft 12 has an outer peripheral surface in which a pair of axially extending grooves or keyways 12a and 12b are formed.

A clutch release bearing 13 is slidably disposed between the transmission 15 and the clutch 10. The release bearing 13 moves axially on the input shaft 12 between an engaged and disengaged position. In the engaged position, the clutch 10 connects to the transmission input shaft 12 for rotation together. In the disengaged position, the clutch 10 disconnects from the shaft 12 allowing it to rotate freely.

The clutch brake 20 is an annular assembly mounted on the shaft 12 between the release bearing 13 and the transmission 15 that rotates freely with the transmission input shaft 12. However, when it is desired to slow or stop the rotation of the transmission input shaft 12 for shifting, the release bearing 13 is moved toward the transmission 15. When so moved, the clutch brake 20 is frictionally engaged between the release bearing 13 and the bearing cap of the transmission 15. As a result, the rotation of the clutch brake 20 and input shaft 12 is slowed or stopped.

FIGS. 2 through 6 illustrate in detail the structure of the clutch brake 20 according to the present invention. The clutch brake 20 comprises two arcuate members 40 and 42 having substantially flat, parallel front and rear faces 26 and 28. The arcuate members 40 and 42 are coupled together by fastening means, namely rivet 44 and belleville washer 46, at one end 40a and 42a of the arcuate members. This is the pivoting point of the clutch brake. The clutch brake 20 includes the tabs 22 and 24 disposed 180° apart for engagement with the input shaft 12 through its keyways 12a and 12b. The front and rear faces 26 and 28 are provided with friction facings 30, 32, 34 and 36 which are securely bonded to the opposite sides of each of the sections 26 and 28.

Figure 6:
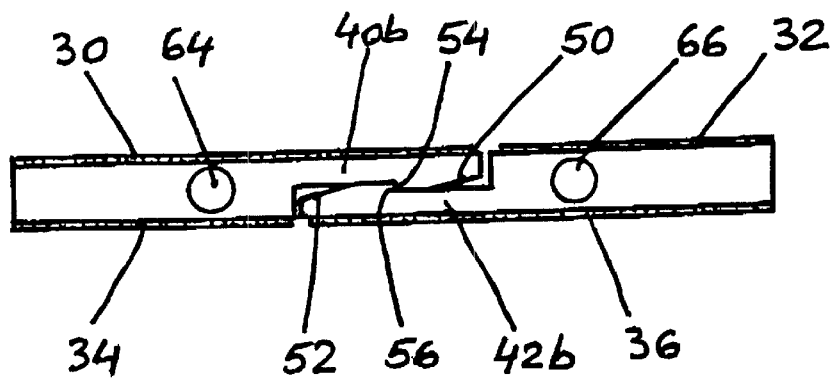
FIG. 6 is a side elevational view taken from the bottom of FIG. 3.

In order to form a closed annular assembly 20 engaged with the tabs 22 and 24 on the input shaft 12, the second end 40b and 42b of the members 40 and 42 are formed with complementarily shaped mating projections, as shown in FIG. 6, to form a "snap-on" end.

Figure 5:
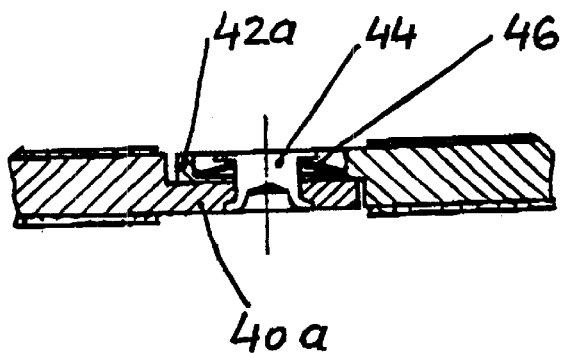
FIG. 5 is a cross-sectional view taken along line 5—5 in FIG. 3.

Both ends (pivoting and snap-on) have important functional and dimensional features which constitute important aspects of the invention. Both ends are manufactured in such a way that after the assembly and installation, the two arcuate members 40 and 42 are in flat, coplanar alignment. However, during assembly, the two halves move out of alignment to permit the second free ends 40b and 42b to come into locking engagement. To this end, the ends 40a, 42b are preferably secured to each other in such a manner as to allow some out-of-plane movement of the two halves 40, 42. Accordingly, ends 40a and 42b are fastened by using a rivet 44 with a belleville washer 46 positioned under the head of the rivet as shown in FIG. 5. The riveting is done in such a way that the belleville washer 46 is not compressed so that it is totally flat. Doing this, while holding the two arcuate members together, allows an easy pivoting and an elastic flexing, so the snap-on end 40b and 42b can close and stay closed. In the absence of the flexible pivot connection, the two arcuate members 40, 42 must be sufficiently flexible to allow the free ends 40b, 42b to slide over each other.

The free ends 40b, 42b of the arcuate members 40b and 42b are preferably shaped as shown in FIG. 6. The ends 40b and 42b slide over each other due to the complementarily-shaped inclined surfaces or ramps 50 and 52, and lock in place when the substantially perpendicular straight edges 54 and 56 engage each other. The closing of the annular assembly 20 is done by bringing the ends 40b and 42b together until the ends are in the position shown in FIG. 6. This is usually accompanied by an audible snap, thus signaling to the installer that the assembly is fully closed. While the free ends 40b, 42b have been described and illustrated as having a ramped surface, other complementary shapes are contemplated so long as they provide for an interlocking relationship between the ends 40b and 42b.

The installation of the bell housing clutch brake 20 is done through the inspection port of the transmission bell housing which is about 5×8 inches, providing limited access to the components housed in the bell housing. To further facilitate the closing of the clutch brake 20, two pins 60 and 62 are provided which are adapted to be removably received in two holes 64 and 66 located near the snap-on ends 40b, 42b. The pins are squeezed together until the snap is heard, and then are removed from the holes 64, 66.

To remove the clutch brake 20, a screwdriver merely needs to be inserted between the two snap-on halves and rotated to disengage the mating surfaces and accomplish the separation.

Thus, a clutch brake assembly has been provided that meets all the objects of the invention. While the invention has been described in terms of a preferred embodiment, there is no intent to limit it to the same. Instead, the invention is defined by the following claims.

What is claimed is:

1. A clutch brake adapted to be connected to a rotating shaft having a pair of radially-opposed keyways, the clutch brake comprising:
   a first arcuate member with a first end and a second end;
   a second arcuate member with a first end and a second end;
   a pivot connector coupling the first end of the first arcuate member to the first end of the second arcuate member so that the arcuate members pivot with respect to each other in a substantially flat coplanar relationship;
   the first and second arcuate members each including a projecting tab for engagement with one of the keyways of the shaft; and
   the second ends of each arcuate member including complementarily-shaped mating projections for releasably joining the second ends of the arcuate members to each other to removably secure the clutch brake to the shaft.

2. The clutch brake of claim 1 wherein, when the second ends of the arcuate members are joined together, the two arcuate members are forced out of their coplanar relationship upon initial engagement of the complementarily-shaped mating projections and return to their coplanar relationship when the mating projections are properly seated.

3. The clutch brake of claim 2 wherein an audible noise is created upon the mating projections being properly seated.

4. The clutch brake of claim 1 wherein each of the complementarily-shaped mating projections is inclined away from the second end of its respective arcuate member to form a tab, each arcuate member including a relieved area spaced from the second end for seating the tab of the other arcuate member.

5. The clutch brake of claim 2 wherein the pivot connector is adapted to permit a minor amount of non-coplanar pivotal movement between the first and second arcuate members to accommodate the engagement of the complementarily-shaped mating projections.

6. The clutch brake of claim 5 wherein the first end of one of the arcuate members includes a countersunk portion and the pivot connection comprises a rivet with a shaft and a head, the head being adapted to be received in the countersunk portion, and a flexible washer being secured to the shaft of the rivet underneath the head of the countersunk portion.

7. The clutch brake of claim 1 wherein the arcuate members have generally flat, opposed faces, the opposed faces having a friction-enhancing surface.

8. The clutch brake of claim 1 wherein the second ends of the arcuate members include an aperture adapted to removably receive a rod, a pair of rods when located in the holes providing levers that may be gripped to facilitate the seating of the complementarily-shaped mating projections.

9. A clutch brake adapted to be connected to a rotating shaft having a pair of radially-opposed keyways, the clutch brake comprising:
   a first arcuate member with first and second ends;
   a second arcuate member with first and second ends;
   a pivot connector coupling the first end of the first arcuate member to the first end of the second arcuate member so that the arcuate members pivot with respect to each other and a substantially flat, coplanar relationship, the pivot connection comprising a rivet with a shaft and a head, the head being adapted to be received in a countersunk portion on the first end of one of the arcuate members, and a flexible washer being secured of the shaft of the rivet underneath the head within the countersunk portion;
   the first and second arcuate members each including a projecting tab for engagement with one of the keyways of the shaft; and
   the second ends of each arcuate member having complementarily-shaped mating sections for releasably joining the second ends of the arcuate members to each other to removably secure the clutch brake to the shaft.

10. The clutch brake of claim 9 wherein, when the second ends of the arcuate members are joined together, the two arcuate members are forced out of their coplanar relationship upon initial engagement of the complementarily-shaped mating projections and returned to their coplanar relationship when the mating projections are properly seated.

11. The clutch brake of claim 10 wherein an audible noise is created upon the mating projections being properly seated.

12. The clutch brake of claim 9 wherein each of the complementarily-shaped mating projections is inclined away from the second ends of its respective arcuate member to form a tab, and each arcuate member includes a relieved area spaced from the second end for seating the tab of the other arcuate member.

13. The clutch brake of claim 9 wherein the arcuate members have generally flat, opposed faces, the opposed faces having an opposed friction enhancing surface.

14. The clutch brake of claim 9 wherein the second ends of the arcuate members include an aperture adapted to removably receive a rod, a pair of rods when located in the holes providing levers that may be gripped to facilitate the seating of the complementarily-shaped mating projections.

15. A clutch brake adapted to be connected to a rotating shaft having a pair of radially-opposed keyways, the clutch brake comprising:

a first arcuate member with a first end and a second end;

a second arcuate member with a first end and a second end;

a pivot connector coupling the first end of the first arcuate member to the first end of the second arcuate member so that the arcuate members pivot with respect to each other in a substantially flat coplanar relationship, the pivot connector being adapted to permit a minor amount of non-coplanar pivotal movement between the first and second arcuate members;

the first and second arcuate members each including a projecting tab for engagement with one of the keyways of the shaft; and the second ends of each arcuate member including complementarily-shaped mating projections for releasably joining the second ends of the arcuate members to each other to removably secure the clutch brake to the shaft.

16. The clutch brake of claim 15 wherein, when the second ends of the arcuate members are joined together, the two arcuate members are forced out of their coplanar relationship upon initial engagement of the complementarily-shaped mating projections and return to their coplanar relationship when the mating projections are properly seated.

17. The clutch brake of claim 16 wherein an audible noise is created upon the mating projections being properly seated.

18. The clutch brake of claim 15 wherein each of the complementarily-shaped mating projections is inclined away from the second end of its respective arcuate member to form a tab, each arcuate member including a relieved area spaced from the second end for seating the tab of the other arcuate member.

19. The clutch brake of claim 15 wherein the first end of one of the arcuate members includes a countersunk portion and the pivot connection comprises a rivet with a shaft and a head, the head being adapted to be received in the countersunk portion, and a flexible washer being secured to the shaft of the rivet underneath the head of the countersunk portion.

20. The clutch brake of claim 15 wherein the second ends of the arcuate members include an aperture adapted to removably receive a rod, a pair of rods when located in the holes providing levers that may be gripped to facilitate the seating of the complementarily-shaped mating projections.

* * * * *